US012728970B2

(12) United States Patent
Zhang et al.

(10) Patent No.: US 12,728,970 B2
(45) Date of Patent: Sep. 8, 2026

(54) MODULAR UNDERWATER PIPELINE INSPECTION DEVICE

(71) Applicant: The Hong Kong University of Science and Technology, Kowloon (HK)

(72) Inventors: Huibo Zhang, Kowloon (HK); Fumin Zhang, Kowloon (HK)

(73) Assignee: The Hong Kong University of Science and Technology, Kowloon (HK)

( * ) Notice: Subject to any disclaimer, the term of this patent is extended or adjusted under 35 U.S.C. 154(b) by 9 days.

(21) Appl. No.: 18/811,366

(22) Filed: Aug. 21, 2024

(65) Prior Publication Data

US 2025/0108895 A1 Apr. 3, 2025

Related U.S. Application Data

(60) Provisional application No. 63/587,150, filed on Oct. 1, 2023.

(51) Int. Cl.
*B63G 8/00* (2006.01)
*B63G 8/08* (2006.01)
(Continued)

(52) U.S. Cl.
CPC ............... *B63G 8/001* (2013.01); *B63G 8/08* (2013.01); *F16L 55/18* (2013.01); *G05D 1/248* (2024.01); *G05D 1/689* (2024.01); *B63G 2008/004* (2013.01); *G05D 2105/89* (2024.01); *G05D 2107/27* (2024.01); *G05D 2109/38* (2024.01)

(58) Field of Classification Search
None
See application file for complete search history.

(56) References Cited

U.S. PATENT DOCUMENTS

2018/0080905 A1* 3/2018 Al Nahwi .............. G01N 29/04
2021/0071801 A1 3/2021 Lisnyak
2023/0221725 A1* 7/2023 Tyers ....................... G05D 1/43 701/21

FOREIGN PATENT DOCUMENTS

CN 107097918 A * 8/2017 ............. B63C 11/52
CN 108263582 A * 7/2018 ............... B63G 8/14
CN 110955252 A 4/2020
CN 110978039 A * 4/2020 ............. B63C 11/52
CN 109649610 B * 10/2020 ............ B63C 11/52
(Continued)

OTHER PUBLICATIONS

Chen et al. CN 109649610 A English Description, retrieved from Espacenet on Nov. 13, 2025 (Year: 2025).*
(Continued)

*Primary Examiner* — Amelia Vorce
(74) *Attorney, Agent, or Firm* — Amin, Turocy & Watson, LLP

(57) ABSTRACT

Architectures and techniques are for significantly improving operation of unmanned underwater vehicles (UUVs). For example, a UUV can have modular interfaces that can be configured to interchangeably connect different types of sensors to facilitate different UUV applications, to interchangeably connect different types of clamping devices that can be configured for different types or sizes of underwater pipe, and can comprise a mother ship interface that can be used to exchange information and supply a fluid for the clamping device. The UUV can comprise a PID controller that can be used for autonomous navigation to a target location of the underwater pipe and autonomous coupling, via the clamping device, to the underwater pipe.

20 Claims, 10 Drawing Sheets

(51) Int. Cl.

| | |
|---|---|
| ***F16L 55/18*** | (2006.01) |
| ***G05D 1/248*** | (2024.01) |
| ***G05D 1/689*** | (2024.01) |
| ***G05D 105/80*** | (2024.01) |
| ***G05D 107/00*** | (2024.01) |
| ***G05D 109/30*** | (2024.01) |

(56) References Cited

FOREIGN PATENT DOCUMENTS

| | | | | | |
|---|---|---|---|---|---|
| CN | 113606096 A | | 11/2021 | | |
| CN | 113953277 A | * | 1/2022 | ............ | B25J 9/1697 |
| CN | 114190321 A | * | 3/2022 | ............ | G01D 21/02 |
| CN | 114408138 A | * | 4/2022 | ............ | H04N 7/181 |
| CN | 114669933 A | * | 6/2022 | ............ | B63C 11/52 |
| CN | 114164424 B | | 5/2023 | | |
| CN | 116690088 A | | 9/2023 | | |
| KR | 102017039402 A | | 4/2017 | | |
| KR | 20230054127 A | * | 4/2023 | ......... | B63B 17/0018 |

OTHER PUBLICATIONS

Feng et al. CN 107097918 A English Description, retrieved from Espacenet on Nov. 13, 2025 (Year: 2025).*

DAS. Ferromagnetic Pipe Climbing Robot Climbing Robot; Crazy Engineer, Jun. 22, 2019.

Wang, Q., & Zhao, J. (2007). Analysis and countermeasures of third-party damage failure of submarine pipelines. Petrochemical Equipment, 03, 18-21.

Lou, M. (2005). Numerical simulation of hydrodynamic characteristics and dynamic response of vortex-induced vibration in submarine pipeline span sections. (Doctoral dissertation, Ocean University of China). Qingdao.

Feng, H., Wang, Y., & Wang, J. (2012). Treatment methods and applicability analysis of submarine pipeline spans. In China Shipbuilding Engineering Society Offshore Engineering Committee (Ed.), Proceedings of the 2012 Marine Engineering Academic Conference (pp. 8). China Shipbuilding Engineering Society Offshore Engineering Committee.

Du, W. (2018). Analysis of diving operation safety risks and countermeasures. Modern Manufacturing Technology and Equipment, 02.

Zhang, Z.H.; He, F.J. Design and analysis of an out-of-pipe crawling robot for row pipes. Mech. Transm. 2016, 40, 63-66.

Hans-Joachim, B. Grabenlose Auswechslung von Erdkabelleitungen. Acta Montan. Slovaca 2007, 12, 237-241.

Wang, Z.Y. Structural Design and Adsorption Performance of Wind Turbine Tower Cleaning Robot; Harbin Engineering University: Harbin, China, 2016; pp. 30-35.

* cited by examiner

600

MODULAR UNDERWATER PIPELINE INSPECTION DEVICE

CROSS REFERENCE TO RELATED APPLICATION

This application is a nonprovisional application claiming priority to U.S. Provisional Patent Application No. 63/587,150, filed on Oct. 1, 2023, entitled "Modular Underwater Pipeline Inspection Robot Based on Mecanum Wheel", the entirety of which priority application is hereby incorporated by reference herein in its entirety.

TECHNICAL FIELD

The following description relates generally to a modular underwater pipeline inspection device and, in particular, to a modular unmanned underwater vehicle that can autonomously navigate to, and securely couple to, a target location of an underwater pipeline.

BACKGROUND

Remotely Operated Vehicles (ROVs) have long been a pivotal tool in the development of underwater assets such as underwater oil fields or the like. These ROVs can cater to tasks such as Inspection, Repair, and Maintenance (IRM) of seabed infrastructures—including those utilized for oil and natural gas production—as well as deep sea resource exploration for scientific research purposes. Recently, the application of ROVs in various commercial endeavors has been on the rise, each demanding cost-effective operations like underwater construction. The market for ROV operations is perceived as fairly conservative, evolving with the changing technological demands aimed at reducing the operational costs of both ROVs and mother ships such as surface vessels that launch the ROVs.

The advent of underwater robotics dates back to the 1980s when Remotely Operated Vehicles (ROVs) emerged as comprehensive tools for sub-aquatic observation, measurement, maintenance, salvage, and other scientific and technological applications under the sea. The definition and concept of ROVs were primarily outlined by the United Nations ROV Research Committee's guidelines (1984) and the National Research Council's "Submersible Vehicles and National Needs" (1996). These entities facilitated a professional infrastructure for underwater exploration robot and ROV companies and operators, focusing on ensuring safe underwater working conditions, particularly when these vehicles operate in hazardous marine environments.

The importance of ROVs and Autonomous Underwater Vehicles (AUVs) has grown substantially, especially in the domain of deep-sea exploration. Their applications span across various sectors of the marine environment, addressing the country's vast marine territories that cover about 70% of its total land area. The abundant marine resources and the potential for resource exploration, especially in the South China Sea, have necessitated the increased demand for ROV technologies. The progression from conventional shallow waters to deeper marine territories has seen ROVs occupying a significant position in underwater exploration and resource extraction activities.

For example, the "Blue Whale 1" exploration by China National Petroleum Corporation Aerospace Group in 2017 marked a notable venture in drilling natural gas hydrates in the South China Sea. This endeavor hinted at a global shift towards deep-sea exploration and joint extraction efforts in China's eastern deep-sea territories, propelling the rapid development of ROVs.

Pipe-climbing robots are mainly used in industrial production, cable inspection, and chemical fields by virtue of walking outside the pipe. The pipeline robots are mainly divided into three category types according to how they hold the pipeline: bionic, mechanical holding, and gravity self-locking. According to the manner of movement, mechanical clinging robots can be divided into four sub-categories, namely wheel type, crawler type, foot type, and parallel mechanism type, as shown in FIG. 1.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
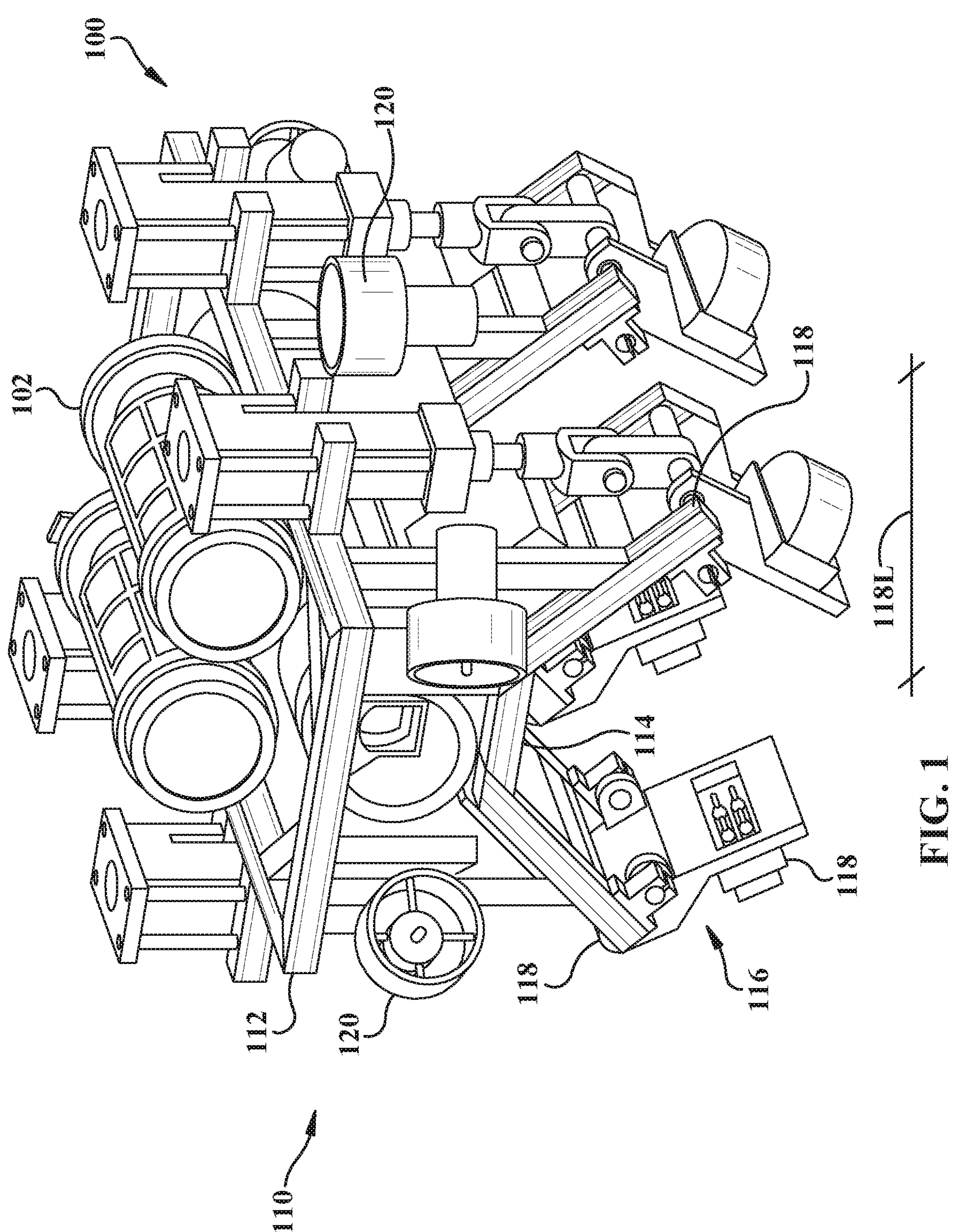
FIG. 1 presents a graphical depiction of an example UUV indicative of a modular underwater pipeline inspection device in accordance with certain embodiments of this disclosure.

ROV technology has undergone considerable evolution, with initial designs mainly focused on observational capacities. However, with the expanding demands in underwater oil and gas sectors, working-class ROVs have become indispensable. These machines have played pivotal roles in scientific expeditions, underwater oil and gas drilling, pipeline inspections, and maintenance in marine engineering projects, especially in the South China Sea region where natural gas hydrate exploration has been successful. ROVs and unmanned underwater vehicles (UUVs), including autonomous underwater exploration robots, and have been widely applied in various fields of the marine environment. For instance, in 2017, the China National Petroleum Corporation Aerospace Group Company utilized the “Blue Whale 1” aerospace deep-sea oil and gas drilling joint natural gas exploration platform for the first time, successfully conducting exploratory drilling and trial extraction of methane hydrate from the discharge pipelines located in the South China Sea.

Despite these advancements, several challenges persist in the domain of underwater robotics. One significant issue is the absence of a steady-state regulation system in most ROVs, requiring manual intervention to secure them onto pipelines, thus escalating both operational costs and associated risks. The lack of stable anchoring mechanisms makes existing drones susceptible to detachment from pipelines under strong currents, limiting the inspection to only a small portion of the forward path. This manual intervention of attaching or reattaching increases the cost and risk factor associated with the underwater operations.

Moreover, the depth limitation of many small ROVs, which is approximately 100 meters due to constraints in material, communication, and other technological aspects, restricts their operational capacities in deeper marine territories. Furthermore, the monopoly of certain countries like Germany, Japan, and the US on the market and related technology of underwater pipeline inspection robots has posed challenges in scaling the technology, making it cost-prohibitive and limiting widespread adoption.

Furthermore, the robots are easily affected by ocean currents. Previous produced robots lacked a fixed structure, hence during inspection, were easily impacted by ocean currents and wind waves, causing them to detach from the pipelines.

On a broader scale, the traditional and somewhat conservative market for ROV operations necessitates a significant reduction in operational costs, particularly concerning mother ship expenses and personnel costs, to promote wider deployment and advancements in ROV technology. Despite these hurdles, the continuous maturation of unmanned aerial vehicle technology globally heralds a promising avenue for addressing some of the identified challenges in ROV technology.

With the rapid expansion of the offshore oil industry in recent times, there arises an urgent need for advanced surveillance and maintenance systems to ensure operational safety and ecological protection. The intricate marine environment, characterized by significant variations in the seabed topology, poses substantial threats to submarine pipelines. A prime challenge is the unavoidable seabed deformation triggered by oceanic currents, tides, and eddies, leading to the formation of suspension spans along the submarine pipelines. These phenomena can result in unsupported segments of pipelines, affecting their structural integrity during operational phases and potentially endangering the marine ecological milieu.

The disclosed subject matter, in some embodiments is directed to overcoming the aforementioned issues and challenges relating to UUVs and underwater pipeline inspection. For example, the disclosed UUV can have a modular design such that a customizable set of sensors or other equipment can be attached to the UUV to facilitate a wide range of varying applications and/or uses. Likewise, the UUV can comprise a modular clamping interface to facilitate attaching or coupling to a wide range of different types or sizes of underwater pipes or conduits, and to facilitate the addition of other equipment such as pipeline maintenance equipment.

For example, the UUV can be equipped with a crawling mechanism, navigation apparatus, clamping assembly, and a robust hydraulic or pneumatic systems, ensuring the UUV maintains stability underwater and achieves firm adherence to the pipeline walls during pipeline traversal or “crawling” operations. The hydraulic or pneumatic systems can be fed by a fluid line or conduit to the mother ship that supplies a fluid such as a hydraulic fluid or compressed air to the clamping assembly. This fluid line can also serve as a communication line for data transfer between the UUV and the mother ship, e.g., by housing, an Ethernet or fiber optic cable.

Furthermore, the UUV can comprise a set of thrusters that can facilitate omnidirectional movement underwater. By leveraging a proportional-integral-derivative (PID) controller or the like, the UUV can autonomously navigate to a target location of the underwater pipeline and can autonomously attach to the underwater pipeline at the target location, which can be accurately accomplished via the PID controller despite the potential for underwater currents or other environmental factors that affect navigation. Such can mitigate or eliminate the need for manual attachment to the underwater pipeline.

Once attached to the underwater pipeline (e.g., via a hydraulic or pneumatic clamp) can traverse and inspect the underwater pipeline by leveraging the customizable set of sensors. In some embodiments, the underwater pipeline can be traversed along a length of the pipeline or by rotating around the pipeline, via Mecanum wheels.

The disclosed UUV can thus overcome many of the challenges that confront existing UUVs. For example, the disclosed UUV can be more securely engaged to the underwater pipeline (e.g., via the hydraulic or pneumatic clamp) allowing the UUV to remained coupled to the underwater pipeline in the face of strong sea or ocean currents or winds or pipeline corrosion/erosion. The disclosed UUV can (e.g., via Mecanum wheels) navigate around the entire circumference of the underwater pipeline and can traverse a greater length, potentially at greater depths than existing UUVs.

Moreover, existing UUVs cannot precisely submerge near the pipelines, may fail to identify and measure the distance to the pipelines, and are unable to perform inspections on pipelines of different diameters. As noted above, such difficulties can be mitigated by the disclosed UUV. In that regard, the disclosed UUV can incorporating a variety of features and design improvements, including: employing a mechanical arm to clamp onto the pipeline, utilizing PID steady-state regulation, deploying a Mecanum wheel-based moving platform to enable 360° rotation around the pipeline, integrating GPS positioning, adopting stereo vision recognition, and employing a modular design that facilitates the replacement of the mechanical arm's length and the addition of other structures to achieve different functionalities, which is further detailed below.

Example Systems

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

FIGS. 1-6 depict various perspectives of an example UUV 100 and are intended to be reference together. With initial reference to FIG. 1, a graphical depiction is presented of an example UUV 100 indicative of a modular underwater pipeline inspection device in accordance with certain embodiments of this disclosure. As depicted, UUV 100 can comprise one or more sensors 102 configured to determine a condition or state relating to an underwater pipeline (e.g., underwater pipeline 302 of FIG. 3). Sensor(s) 102 can be any suitable sensor that measures a physical quantity or that receives as input a physical phenomenon. The illustrated example of sensor 102 is a camera device suitable for obtaining stereo vision, but numerous other sensors 102 can be employed such as, e.g., infrared cameras, microphones, pressure sensors, temperature sensors, sonar sensors, conductivity sensors, magnetometers, an acoustic doppler current profiler device, pH sensors, turbidity sensors, electrochemical sensors, laser or LIDAR scanners, radiation detectors, strain gauges, optical fiber sensors, gas detectors, oxidation detectors, organic material detectors, resource/leak detectors, fluorescence sensors, hydrophone arrays, and so on.

UUV 100 can further comprise a modular interface structure 110. Modular interface structure 110 can be coupled to (or be a part of) UUV 100 and can represent a specialized frame or housing for UUV 100 configured to support modular attachment of various equipment or interfaces. For example, modular interface structure 110 can comprise first interface 112 for sensor interfaces of UUV 112 and second interface 114 for interfacing with the underwater pipeline 302.

First interface 112 can comprise a group of sensor interfaces configured to support addition of at least one customizable set of sensors 102. Second interface 114 can be configured to interchangeably receive a clamping apparatus 116 of a group of different clamping apparatuses. Clamping apparatus 116 can comprise mechanical arms 118 that facilitate attachment to underwater pipeline 302. Mechanical arms 118 can have a length 118L selected according to a size or type of underwater pipeline 302.

UUV 100 can further comprise one or more thrusters 120. Thrusters 120 can be configured to provide thrust to UUV 100 to facilitate navigation or propulsion through water. Thrusters 120 can be configured to provide propulsion in both vertical and horizontal directions, for example based on an orientation of the housing or fan blades. As indicated thrusters 120 can be utilized in order to navigate UUV 110 to a target location of underwater pipeline 302, thereby mitigating or eliminating the need for manual placement of UUV 100.

Figures 2A, 2B:
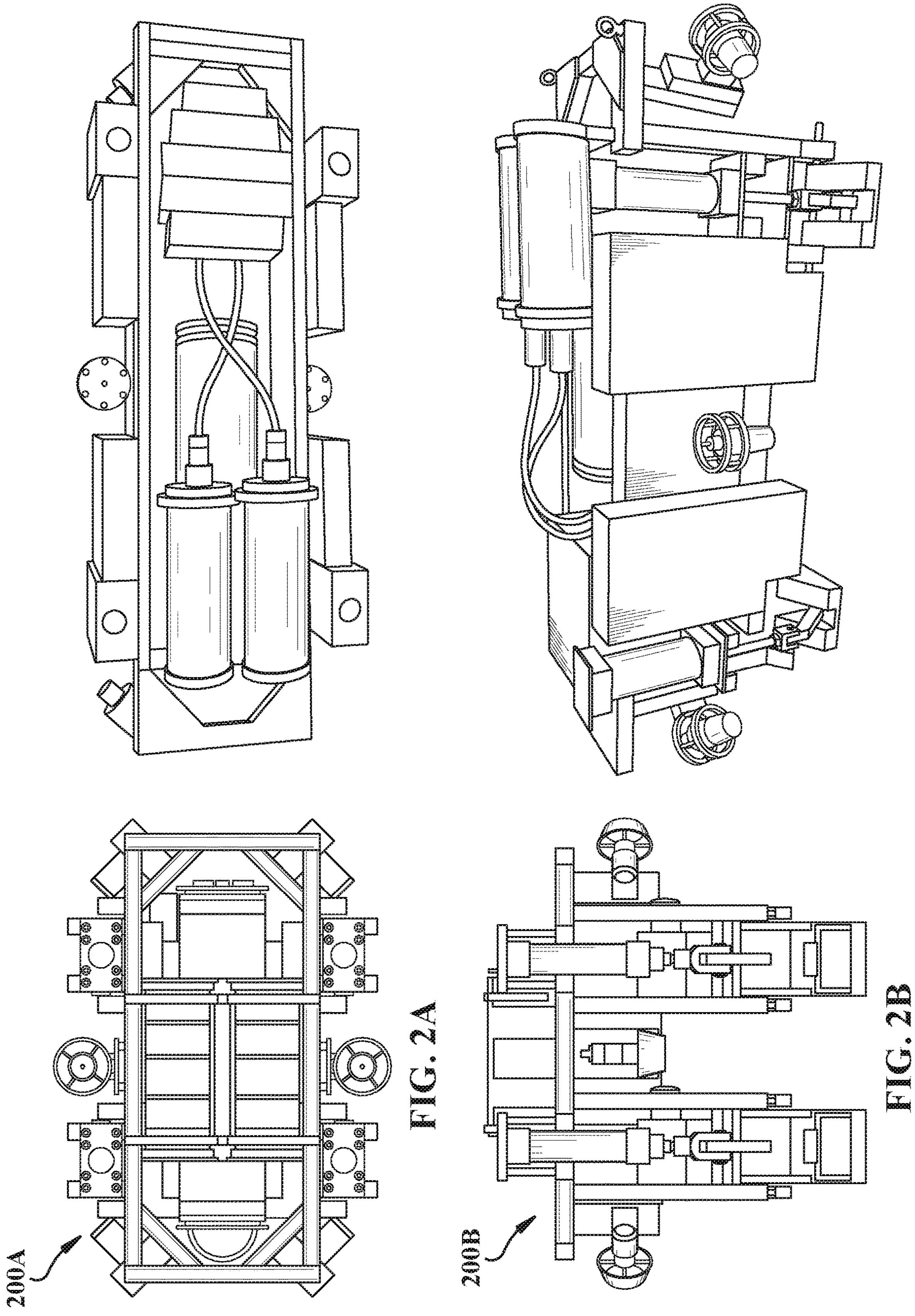
FIG. 2A is a top-down perspective of the UUV illustrated via a side-by-side depiction of a schematic rendering of the UUV and an associated graphical depiction of the UUV in accordance with certain embodiments of this disclosure.
FIG. 2B is a side-view perspective of the UUV illustrated via a side-by-side depiction of a schematic rendering of the UUV and an associated graphical depiction of the UUV in accordance with certain embodiments of this disclosure.

FIG. 2A is a top-down perspective of the UUV 100 illustrated via a side-by-side depiction 200A of a schematic rendering of the UUV 100 and an associated graphical depiction of the UUV 100 in accordance with certain embodiments of this disclosure.

FIG. 2B is a side-view perspective of the UUV 100 illustrated via a side-by-side depiction 200B of a schematic rendering of the UUV 100 and an associated graphical depiction of the UUV 100 in accordance with certain embodiments of this disclosure.

Figure 2C:
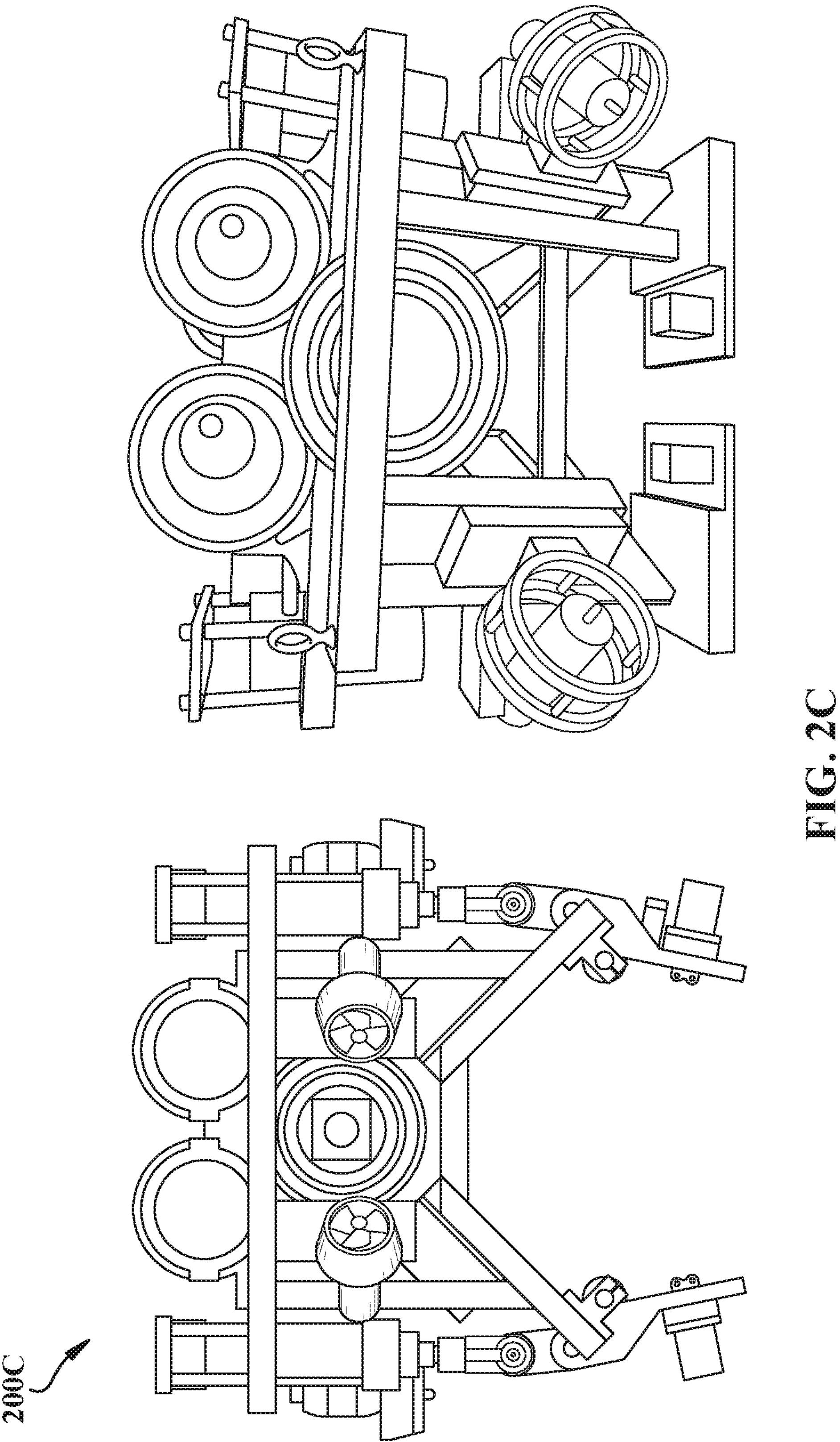
FIG. 2C is a front-view perspective of the UUV illustrated via a side-by-side depiction of a schematic rendering of the UUV and an associated graphical depiction of the UUV in accordance with certain embodiments of this disclosure.

FIG. 2C is a front-view perspective of the UUV 100 illustrated via a side-by-side depiction 200C of a schematic rendering of the UUV 100 and an associated graphical depiction of the UUV 100 in accordance with certain embodiments of this disclosure.

Figure 3:
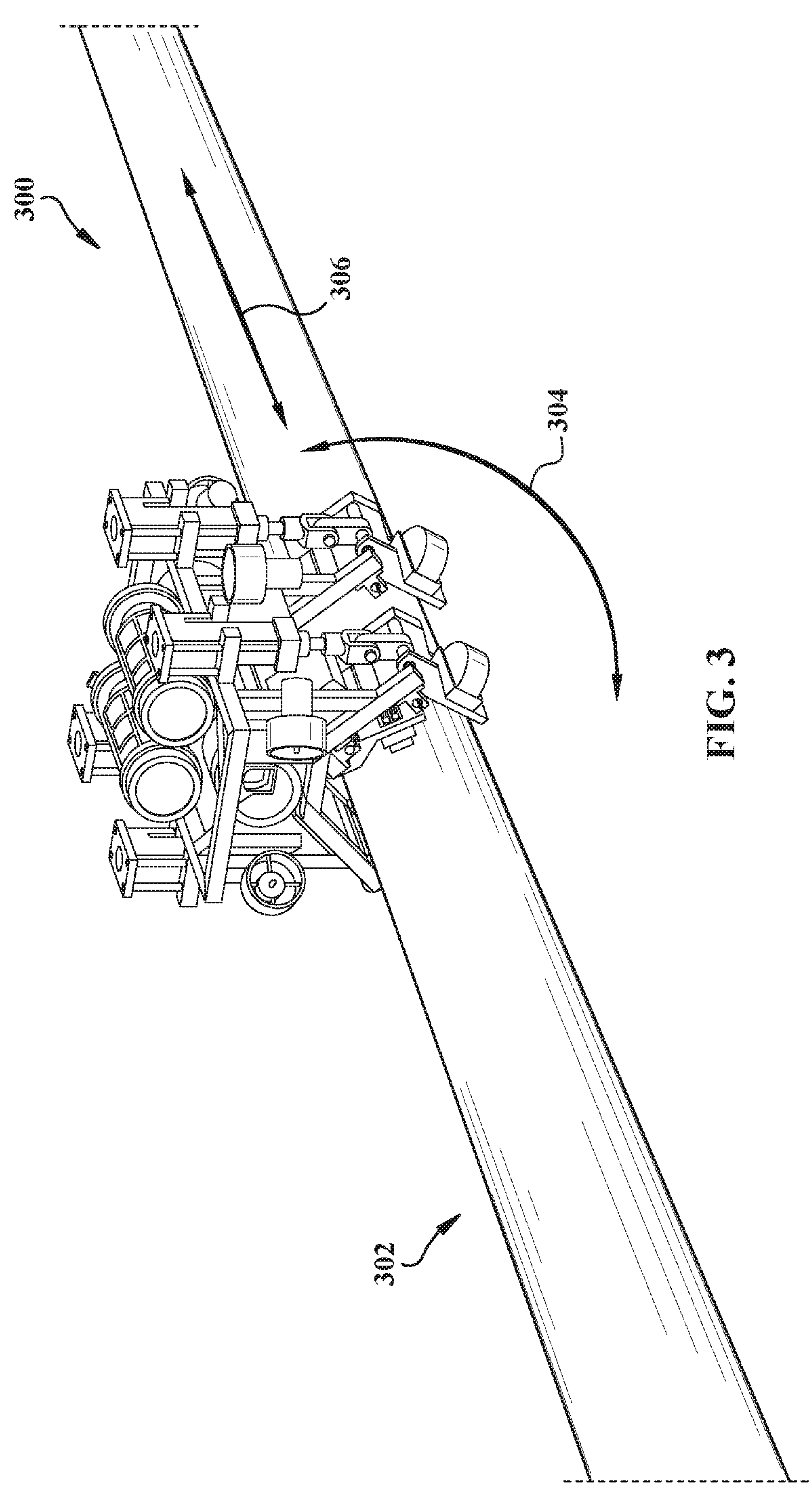
FIG. 3 presents a graphical depiction of the example UUV indicative of a modular underwater pipeline inspection device that is attached to the underwater pipeline in accordance with certain embodiments of this disclosure.

FIG. 3 presents a graphical depiction 300 of the example UUV 100 that is indicative of a modular underwater pipeline inspection device where UUV 100 is attached to the underwater pipeline 302 in accordance with certain embodiments of this disclosure.

As depicted, once attached to underwater pipeline 302, UUV 100 can securely navigate and inspect any suitable portion of underwater pipeline 302. For example, UUV 100 can securely rotate around underwater pipeline 302, as illustrated by rotational direction 304. In some embodiments, rotational direction 304 can extend a complete 360 degrees around underwater pipeline 302. Further, UUV 100 can securely traverse a length of underwater pipeline 302 as shown by axial direction 306.

In some embodiments, both rotational direction 304 and translation in axial direction 306 can be facilitated by a Mecanum wheel assembly or apparatus, which is further detailed in connection with FIGS. 4-6.

Figure 4:
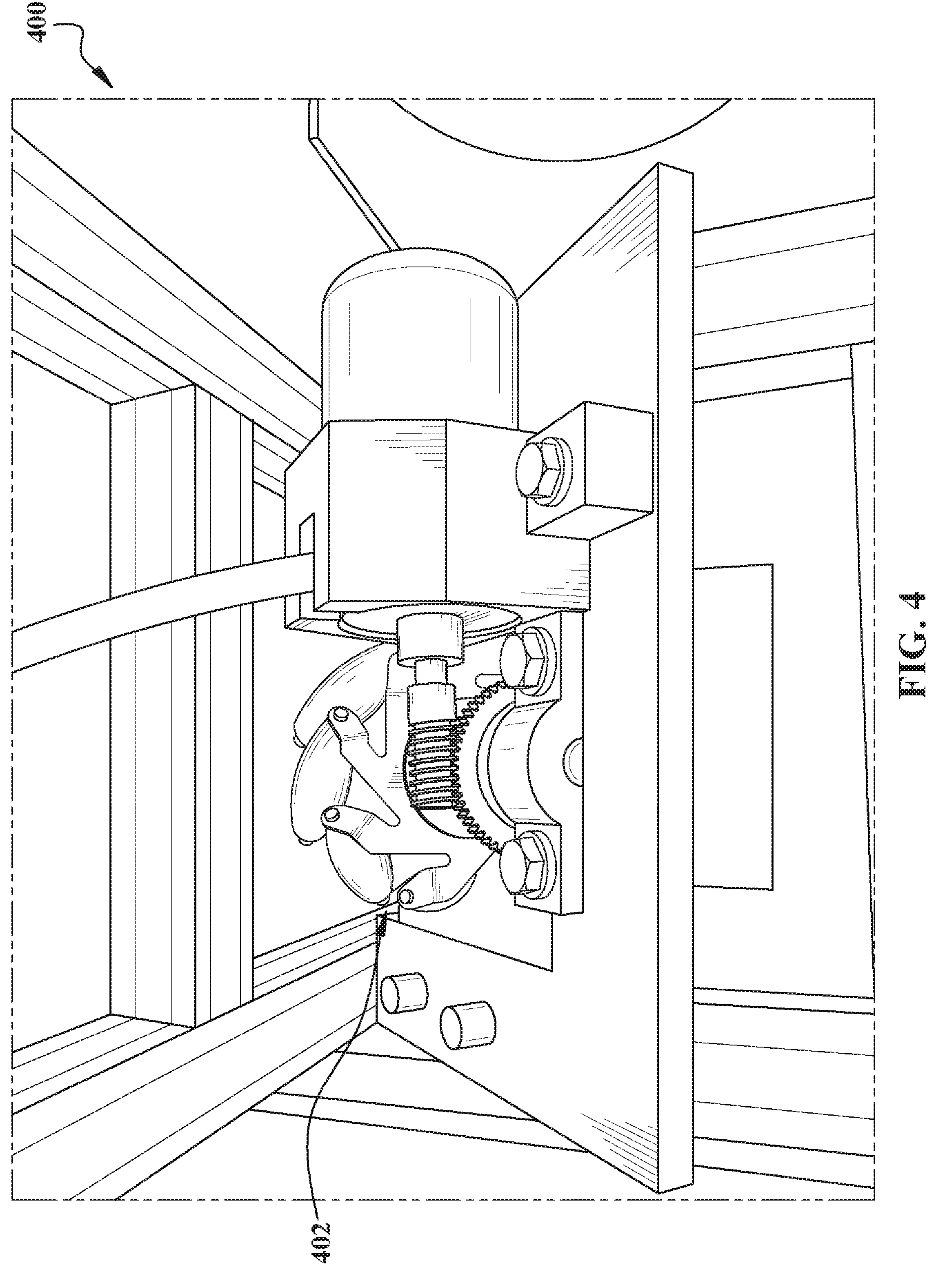
FIG. 4 illustrates an example graphical depiction of an example Mecanum wheel assembly situated on UUV in accordance with certain embodiments of this disclosure.

For example, FIG. 4 illustrates an example graphical depiction 400 of an example Mecanum wheel assembly 402 situated on UUV 100 in accordance with certain embodiments of this disclosure. As detailed above, thrusters 120 can be used in order to navigate UUV 100 omnidirectionally through water to a target location of underwater pipeline 302. At the target location, clamping apparatus 116 can be engaged to securely couple UUV 100 to underwater pipeline 302. Once coupled to underwater pipeline 302, Mecanum wheel assembly 402 can be utilized for traversing underwater pipeline 302, examples of which are further detailed in connection with FIGS. 5 and 6 below.

Figure 5:
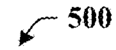
FIG. 5 illustrates an example idealized schematic diagram of an example active wheel of the example Mecanum wheel assembly in accordance with certain embodiments of this disclosure.
Figure 5:
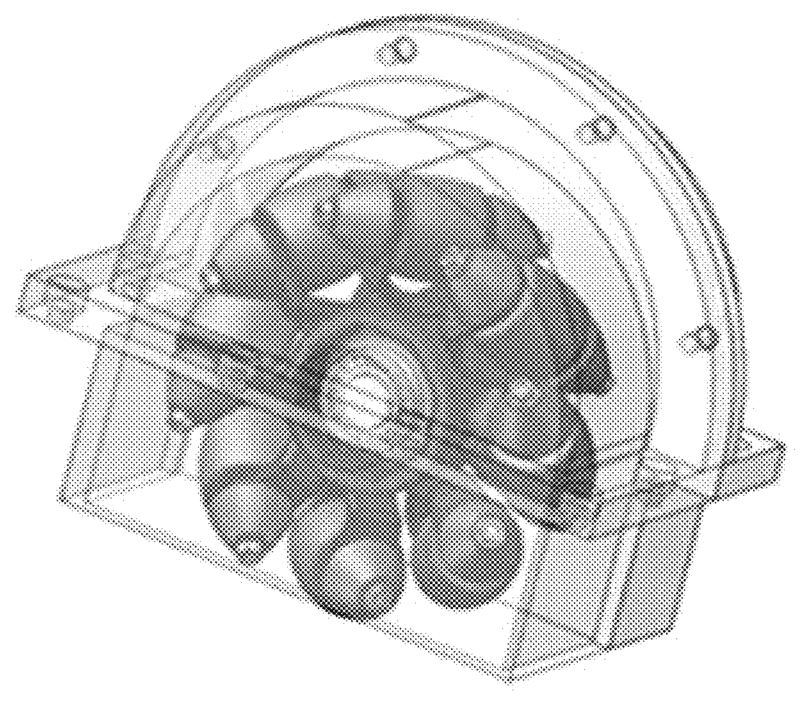

FIG. 5 illustrates an example idealized schematic diagram of an example active wheel 500 of the example Mecanum wheel assembly 402 in accordance with certain embodiments of this disclosure.

Figure 6:
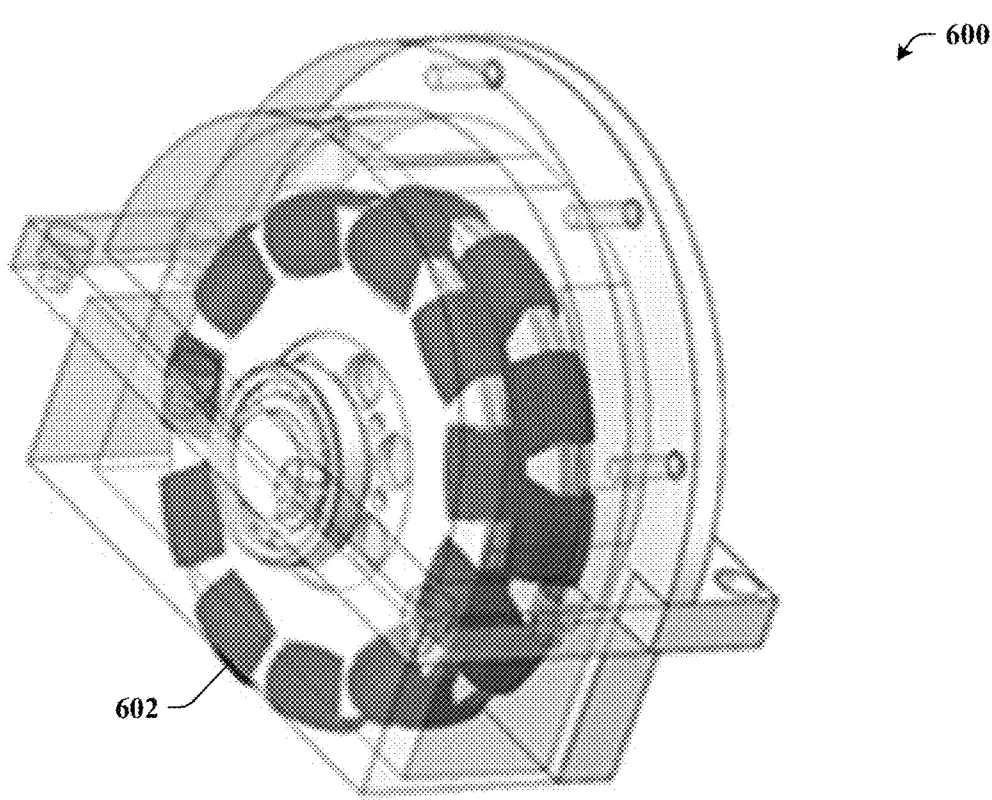
FIG. 6 illustrates an example idealized schematic diagram of an example passive wheel of the example Mecanum wheel assembly in accordance with certain embodiments of this disclosure.

FIG. 6 illustrates an idealized schematic diagram of an example passive wheel 600 of the example Mecanum wheel assembly 402 in accordance with certain embodiments of this disclosure.

Active wheel 500 and passive wheel 600, together can facilitate axial and lateral movement on underwater pipeline 302. Such a design can allow UUV 100 to move effectively and stably along or about underwater pipeline 302. In combination active wheel 500 and passive wheel 600 can provide enhanced drive and flexibility. For example, passive wheel 600 can comprise rollers 602. In some embodiments, rollers 602 can be rubber-coated elements. Rollers 602 can be arranged at an angle to the main wheel axis. Rollers 602 can allow for lateral movement and fine adjustments in positioning without active steering inputs. Such can facilitate smooth navigation along curved or straight sections of underwater pipeline 302. Rollers 602 can further maintain stability and adherence of UUV 100 to underwater pipeline 302 during inspections or other operations, which can leverage passive dynamics to enhance mobility and reduce energy consumption by UUV 100.

Figure 7:
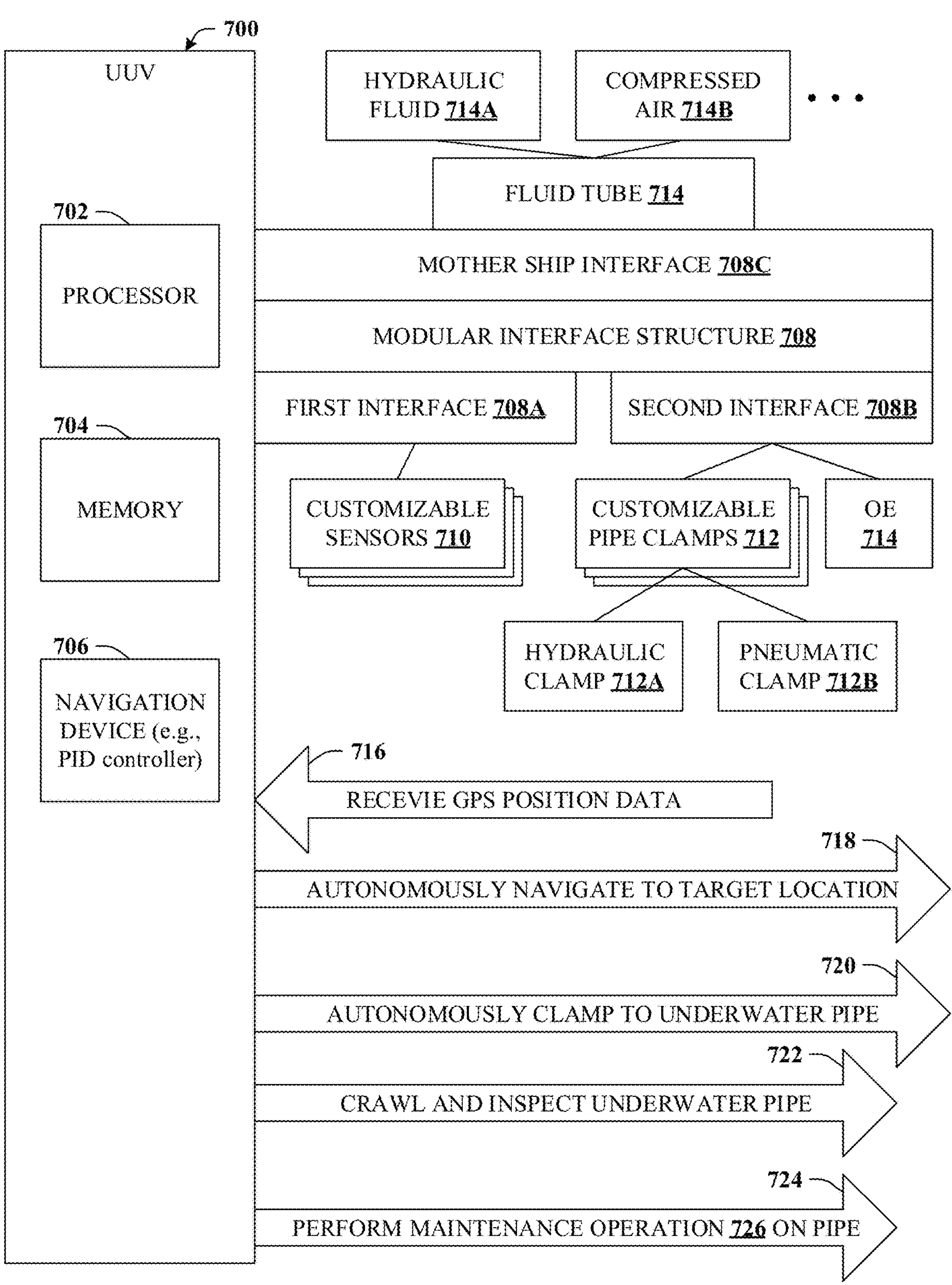
FIG. 7 depicts an example schematic block diagram illustrating an example UUV with interfaces to customize sensors and clamping apparatuses and an interface for a fluid tube to a mother ship in accordance with certain embodiments of this disclosure.

Referring now to FIG. 7, a schematic block diagram 700 is depicted illustrating an example UUV 700 in accordance with certain embodiments of this disclosure. UUV 700 can comprise all or a portion of elements detailed in connection with UUV 100, as well as other elements not yet detailed in connection with UUV 100. For example, in some embodiments, UUV 700 can comprise a processor 702 that can be specifically configured for UUV use. Device 700 can also comprise memory 704 that stores executable instructions that, when executed by processor 702, can facilitate performance of operations. Device 700 can further comprise navigation device 706 that can be configured to provide output suitable for navigation and associated control, particularly with regard to underwater navigation where ocean currents and other environmental factors can impact the navigation. For example, navigation device 706 can be, or can employ, a PID controller.

Processor 702 can be a hardware processor having structural elements known to exist in connection with processing units or circuits, with various operations of processor 702 being represented by functional elements shown in the drawings herein that can require special-purpose instructions, for example, stored in memory 704 and/or navigation device 706. Along with these special-purpose instructions, processor 702 and/or navigation device 706 can be a special-purpose device. Further examples of the memory 704 and processor 702 can be found with reference to FIG. 10. It is to be appreciated that UUV 700 or computer 1002 can represent a server device or a client device and can be used in connection with implementing one or more of the systems, devices, or components shown and described in connection with FIG. 7 and other figures disclosed herein.

In some embodiments, UUV 700 can comprise modular interface structure 708 (e.g., modular interface structure 110 of FIG. 1). As illustrated, modular interface structure 708 can be coupled to UUV 700 and can provide multiple different configurable and/or customizable interfaces for use by UUV 700 to, e.g., customize UUV 700 for a wide variety of different uses or applications.

For example, modular interface structure 708 can comprise first interface 708A (e.g., first interface 112). First interface 708A can comprise any suitable combination of customizable sensors 710 (e.g., sensors 102). Modular interface structure 708 can also comprise second interface 708B (e.g., second interface 114). Second interface 708B can be configured to interchangeably receive a customizable pipe clamp 712 (e.g., clamping apparatus 116) from among a group of different customizable pipe clamps 712. Customizable pipe clamp 712 can comprise mechanical arms (e.g., mechanical arms 118) having a length (e.g., length 118L) selected according to a size or type of a designated underwater pipe (e.g., underwater pipeline 302). In some embodiments, second interface 708B can comprise interfaces for other equipment (OE) 714 such as maintenance equipment or the like, which is further detailed below.

In some embodiments, customizable pipe clamp 712 can be a hydraulic clamp 712A. In some embodiments, customizable pipe clamp 712 can be a pneumatic clamp 712B or another suitable type of clamp. Regardless, it is understood that customizable pipe clamp 712 can be more securely attached to the underwater pipe than other similar UUVs, ensuring that UUV 700 can remain attached to the underwater pipe in the face of forces common to the sea or ocean environment (e.g., strong currents, wind, waves, . . . ) that may cause other UUVs to lose contact with the underwater pipe.

In that regard, modular interface structure 708 can further comprise mother ship interface 708C. Mother ship interface 708C can be configured to receive fluid tube 714. For example, fluid tube 714 can extend from a mother ship (e.g., a surface vessel) to UUV 700. Depending on implementation, fluid tube 714 can comprise hydraulic fluid 714A, compressed air 714B, or another suitable fluid. Fluid tube 714 can comprise hydraulic fluid 714A in a hydraulic clamp 712A implementation or compressed air 714B in an implementation that uses pneumatic clamp 714B.

Regardless, the contents of fluid tube 714 can be directed to customizable pipe clamp 712 by mother ship interface 708C and/or modular interface structure 708. In some embodiments, fluid tube 714 can further comprise a communication cable such as Ethernet, fiber optics, or another suitable communication medium. In some embodiments, the fluid medium can be in separate chambers or conduits as opposed to the communication medium.

As shown at reference numeral 716, in some embodiments, UUV 700 (e.g., via the communication medium of fluid tube 714 and/or mother ship interface 708C) can receive global positioning satellite (GPS) position data. It is appreciated that GPS signals typically do not penetrate ocean water. Hence, GPS navigation is not typically available to UUVs when navigating underwater and, as a result, other UUVs commonly require manual deployment of the UUV at the target location and manual coupling of the UUV to the underwater pipe.

Hence, the GPS position data that is received can be indicative of a location of the mother ship and/or a surface vessel and this information can be leveraged to properly navigate UUV 700 to a target location of underwater pipe. For example, a PID controller can be used for steady-state regulation of the navigation process even in the face of strong currents or wind. Similarly, in some embodiments, similar techniques can be used to accurately identify and measure a travel distance of the UUV and/or a distance to a particular portion of the underwater pipe, which can be used to provide precise and reliable technical support for subsequent inspection, maintenance, and monitoring.

As illustrated in connection with reference numeral 718, UUV 700 can therefore autonomously navigate to a target location of the underwater pipe. In this context, autonomously is intended to mean that UUV 700 navigates via thrusters (e.g., thrusters 120) rather than being placed manually. 'Autonomously' does not necessarily mean no manual control, as remote control signals may be received to provide guidance in some embodiments.

At reference numeral 720, upon successfully autonomously navigating to the target location, UUV 700 can autonomously clamp to the underwater pipe. In other words, UUV 700 can navigate to and be clamped to the underwater pipe without relying on the presence of a diver or the like, but rather can perform these activities autonomously.

At reference numeral 722, upon successfully attaching to the underwater pipe, UUV 700 can crawl and inspect the underwater pipe. As noted, such can involve rotation around the circumference of the underwater pipe (e.g., in rotational direction 304) or traversing length of the underwater pipe (e.g., in axial direction 306). Inspection can rely on all or a portion of customizable sensors 710. For example, video data can be received from a stereo vision sensor or sensor array. In response to analysis of the video data, it can be determined that a maintenance operation 726 is recommended or otherwise indicated to be performed on some portion of the underwater pipe.

At reference numeral 724, in some embodiments, UUV 700 can perform the maintenance operation 726 on the underwater pipe. For example, maintenance operation 726 can relate to further monitoring or inspection of the portion of the underwater pipe, cleaning of the portion of the underwater pipe, cutting or sanding the portion of the underwater pipe, and so on. Other equipment 714 can be utilized to perform maintenance operation 726.

To provide a concrete illustration of certain aspects of UUV 700, consider the following example scenario. Suppose that at a sea surface control center (e.g., aboard the mother ship or in communication with the mother ship), a designated controller (e.g., a gaming controller such as a Sony Playstation 2 controller) facilitates remote upper-computer operation, while acquired data can be seamlessly relayed to the UUVs main control board via a network wire (e.g., deployed through mother ship interface 708C), leveraging serial Ethernet technology. Internally, the UUV 700 can be powered by a robust STM32 microcontroller serving as the core control chip, orchestrating ten three-phase brushless motors with six degrees of freedom, significantly enhancing the UUVs maneuverability and operational efficiency. This sophisticated design can elevate offshore oil industry safety by ensuring reliable submarine pipeline inspections, reducing operational hazards, and contributing to marine ecological preservation.

The clamping system (e.g., customizable pipe clamps 712) can augment stability by employing a hydraulic or pneumatic mechanical arm to securely attach the UUV 700 to the pipeline, effectively countering the force exerted by seawater flowing at a rate of 10 knots or more. This design can ensure stable operation at depths up to 200 meters below sea level or more, providing a robust solution for underwater tasks in challenging marine environments. Despite strong underwater currents, this enhanced clamping system can allow the UUV 700 to maintain its position and operational efficiency, ensuring accurate and reliable data collection or inspection tasks along the seabed pipelines, thereby significantly broadening the robot's operational scope in a wide range of underwater conditions while ensuring marine infrastructure safety and integrity.

The inspection system can amplify coverage by integrating an omnidirectional wheeled platform with a video subsystem, achieving substantial rotation at maximum angles and expanding the inspection scope by 50%. Incorporating Mecanum wheel technology can facilitate a full spectrum of motions including forward movement, lateral shifts, diagonal traverses, and zero-radius spins, augmenting spatial utilization and operational efficiency. The UUV 700, harnessing the agility and flexibility provided by the Mecanum wheels, can adeptly navigate and can adapt to complex underwater environments, ensuring thorough inspection of pipeline infrastructures. The video subsystem can further enrich the inspection process by providing real-time visual feedback, aiding in accurate data collection and analysis. This fusion of omnidirectional mobility and visual monitoring significantly elevates the competency and effectiveness of underwater pipeline inspection endeavors.

The propulsion system can employ, e.g., four horizontal thrusters 120 for directional adjustment and two vertical thrusters 120 for regulating rotation speed, establishing an omnidirectional propulsion mode. This setup can align with path planning strategies, and can provide precise control and maneuverability as the UUV 700 navigates through predetermined routes. By meticulously adjusting the thrust generated by each propeller, the UUV 700 can readily adapt to varying underwater conditions and geometries of the pipeline infrastructure. This adept propulsion system synergizes with intelligent path planning, ensuring accurate positioning and adherence to the outlined inspection path, substantially improving the reliability and effectiveness of the inspection process and paving the way for more accurate data collection and analysis during underwater pipeline inspection operations.

The adoption of modular concepts can amplify or enrich the UUV 700 applicability. This modular design can foster multifunctionality, diverse specifications, small-batch capabilities, and complexity. By interchanging modules on the robotic arm, an array of specialized tasks can be proficiently conducted, expanding the operational scope of the UUV 700 to cater to diverse underwater pipeline inspection and maintenance needs. For instance, the Smartrak pipeline inspection module enables meticulous monitoring and data collection, the underwater pipeline light brushing module provides means for cleaning and preparing pipeline surfaces, and the rope saw pipeline cutting module facilitates precise and efficient underwater pipe cutting tasks. This modular approach underscores the essence of modularity in enhancing functional versatility and readiness to tackle a wide spectrum of tasks, showcasing a high degree of adaptability to complex underwater operational challenges.

The UUV 700, potentially based on Mecanum wheels, can adopt a semi-enveloping structure utilizing a clamping mechanism to grip the underwater pipeline securely. UUV 700 can achieve circumferential and axial movements on the pipeline through active Mecanum wheels and a passive omnidirectional wheel system. With ten underwater motors serving as power sources for six degrees of freedom underwater, and employing sensors with an automatic control system for automated operation, the UUV 700 accomplish certain tasks through a well-coordinated interplay of various mechanisms, systems, both hardware, and software. Power can be supplied by two sets of 4S model aircraft lithium batteries, with an air source provided by a surface vessel. Signal cables and air tubes can establish connectivity between the surface vessel and the pipeline inspection UUV 700.

The communication system encompasses a remote control handle, receiver, main control chip, serial to Ethernet module, and Ethernet cable among others. Signals from the Sony PS2 controller are transmitted to its paired receiver, which is connected to a microcontroller, relaying the key values of the controller buttons to the main control board. The main control board at the surface robot control center transmits the data collected by the receiver to the serial to Ethernet module through the TXD and RXD pins of the serial port. Finally, through the Ethernet cable, the signals from the controller are transmitted to the UUV 700 main control chip for further utilization of the transmitted data, establishing a robust and reliable communication channel for effective underwater inspection operations.

Example Methods

Figure 8:
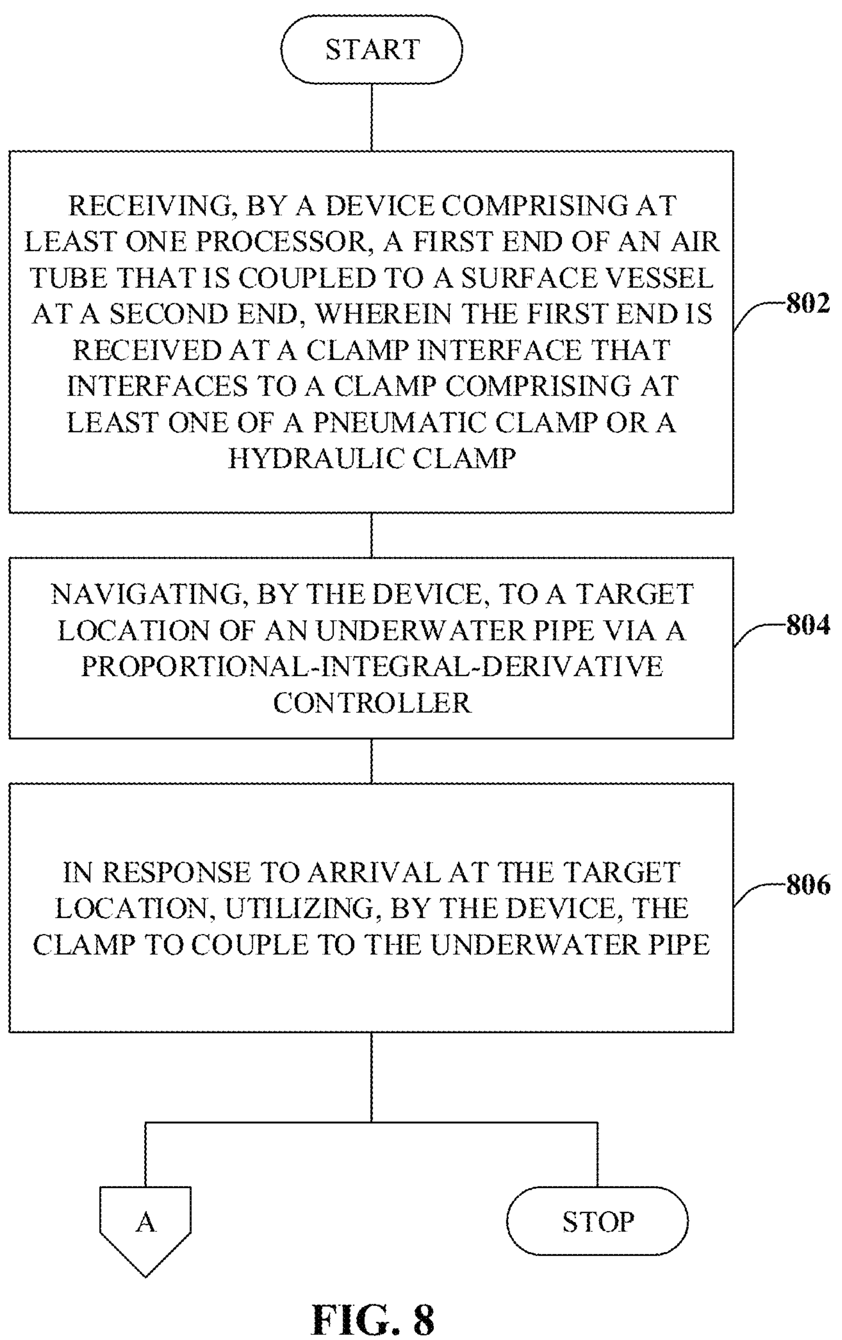
FIG. 8 illustrates an example method that can navigate to a target location of an underwater pipe via a PID controller in accordance with certain embodiments of this disclosure.
Figure 9:
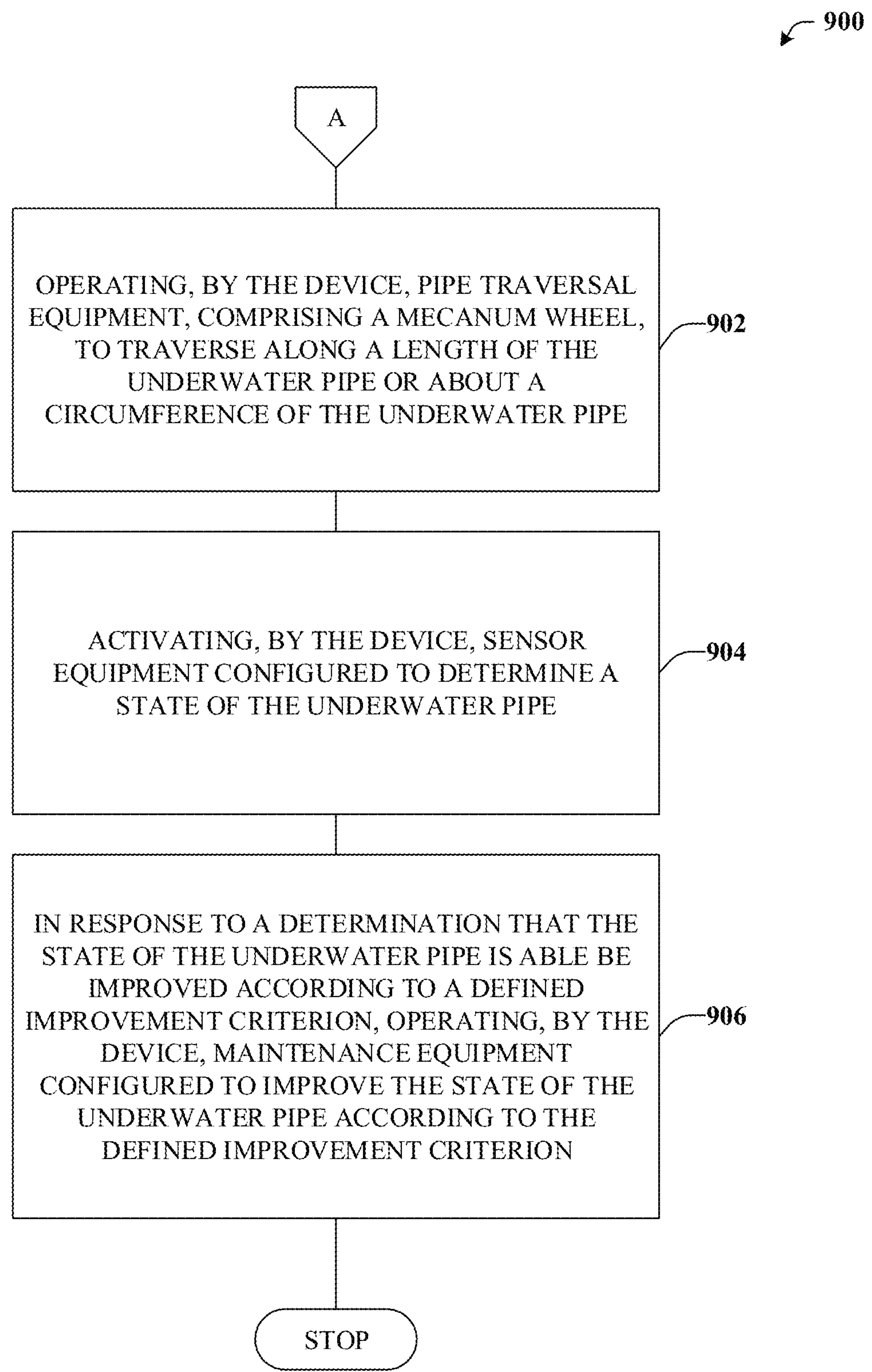
FIG. 9 illustrates an example method that can provide for additional aspect or elements in connection with navigating to a target location of an underwater pipe via a PID controller in accordance with certain embodiments of this disclosure.

FIGS. 8 and 9 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Referring now to FIG. 8, exemplary method 800 is depicted. Method 800 can navigate to a target location of an underwater pipe via a PID controller in accordance with certain embodiments of this disclosure. While method 800 describes a complete method, in some embodiments, method 800 can include one or more elements of method 900, as illustrated by insert A.

At reference numeral 802, a device comprising at least one processor can receive a first end of an air tube that is coupled to a mother ship at a second end. In some embodiments, the first end can be received at a clamp interface that interfaces to a clamp comprising at least one of a pneumatic clamp or a hydraulic clamp.

At reference numeral 804, the device can navigate to a target location of an underwater pipe via a proportional-integral-derivative controller. In some embodiments, such can be based on GPS location data associated with the mother ship or a suitable surface vessel.

At reference numeral 806, in response to arrival at the target location, the device can utilize the clamp to couple to the underwater pipe. In some embodiments, the clamp can be activated by remote signal or by on-board sensors that identify proper location and/or alignment. The hydraulic or pneumatic clamp can provide secure coupling to the underwater pipe in the face of significant environmental factors that might otherwise dislodge the device from the underwater pipe. Method 800 can terminate or continue to insert A, which is further detailed in connection with FIG. 9.

Turning now to FIG. 9, exemplary method 900 is depicted. Method 900 can provide for additional aspect or elements in connection with navigating to a target location of an underwater pipe via a PID controller in accordance with certain embodiments of this disclosure.

At reference numeral 902, the device introduced at reference numeral 802 comprising at least one processor can operate pipe traversal equipment to traverse along a length of the underwater pipe or about a circumference of the underwater pipe. In some embodiments, the pipe traversal equipment can comprise a Mecanum wheel device or apparatus.

At reference numeral 904, the device can activate sensor equipment configured to determine a state of the underwater pipe. In some embodiments, the sensor equipment can comprise cameras or an associated array that can, e.g., provide stereo vision. The sensor equipment can comprise other suitable sensors.

At reference numeral 906, in response to a determination that the state of the underwater pipe is able be improved according to a defined improvement criterion, operating, by the device, maintenance equipment configured to improve the state of the underwater pipe according to the defined improvement criterion. For instance, such can include further monitoring, cleaning, sanding, grinding, cutting, and so on.

Example Operating Environments

Figure 10:
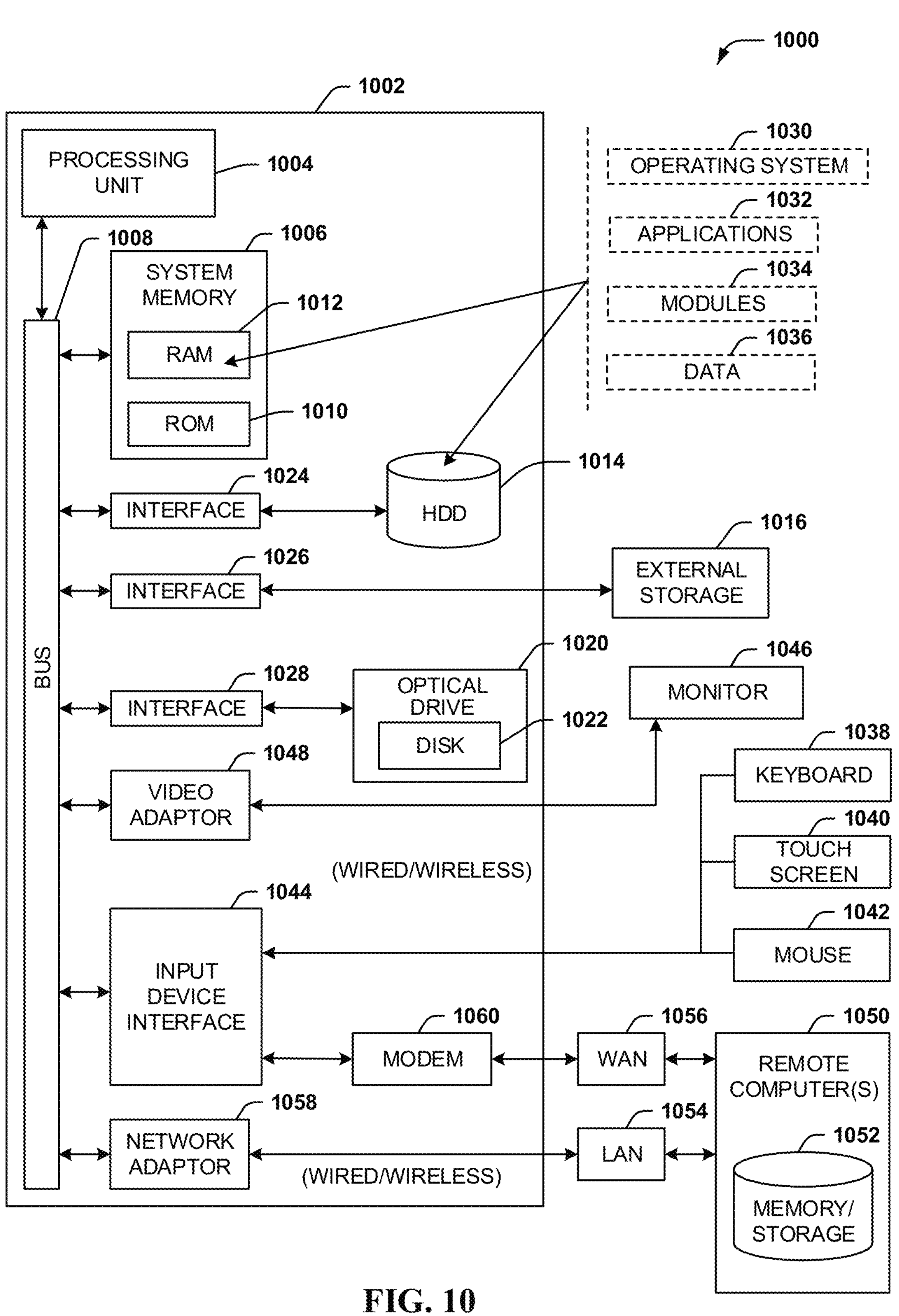
FIG. 10 illustrates an example block diagram of a computer operable to execute certain embodiments of this disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 1102.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10 BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An unmanned underwater vehicle (UUV), comprising:

a sensor configured to determine a condition relating to an underwater pipeline; and a modular interface structure coupled to the UUV and comprising a first interface for the UUV and a second interface for the underwater pipeline, wherein the first interface comprises a group of sensor interfaces configured to support addition of at least one of a customizable set of sensors comprising the sensor, and wherein the second interface is configured to interchangeably receive a clamping apparatus of a group of different clamping apparatuses comprising mechanical arms that contact the underwater pipeline and facilitate a physical attachment of the UUV to the underwater pipeline that counters a force exerted by water flowing around the underwater pipeline, the mechanical arms having a length selected according to a size or type of the underwater pipeline.

2. The UUV of claim 1, wherein the clamping apparatus comprises at least one Mecanum wheel assembly that facilitates rotational movement around the underwater pipeline and translational movement along the underwater pipeline.

3. The UUV of claim 1, wherein the clamping apparatus attaches to the underwater pipeline via a hydraulic clamp device.

4. The UUV of claim 1, wherein the clamping apparatus attaches to the underwater pipeline via a pneumatic clamp device.

5. The UUV of claim 4, wherein the modular interface structure comprises a mother ship interface configured to receive an air tube from a mother ship and direct, via the air tube, compressed air to the pneumatic clamp device.

6. The UUV of claim 1, further comprising:

at least one processor; and at least one memory that stores executable instructions that, when executed by the at least one processor, facilitate performance of operations, comprising:

receiving, from a mother ship, global positioning satellite (GPS) position data associated with the mother ship;

determining a position of the UUV based on the GPS position data; and autonomously navigating to a target location of the underwater pipeline by controlling at least one thruster of the UUV according to a proportional-integral-derivative control procedure that outputs a thruster control signal based on an input signal comprising the GPS position data.

7. The UUV of claim 6, wherein the operations further comprise autonomously attaching, via the mechanical arms, to the underwater pipeline at the target location.

8. The UUV of claim 6, wherein the operations further comprise:

receiving video data from a stereo vision sensor of a set of sensors;

analyzing the video data; and based on the analyzing of the video data, determining a maintenance operation to be performed on a portion of the underwater pipeline.

9. The UUV of claim 8, wherein the maintenance operation comprises at least one of further monitoring or inspection of the portion of the underwater pipeline, cleaning of the portion of the underwater pipeline, or cutting the portion of the underwater pipeline.

10. The UUV of claim 8, wherein the operations further comprise performing, by the UUV, the maintenance operation.

11. A device, comprising:

an unmanned underwater vehicle (UUV) comprising sensing equipment configured to determine a condition relating to an underwater conduit; and a pneumatic clamp device configured to couple to the underwater conduit, the pneumatic clamp device comprising mechanical arms and a compressed air interface configured to receive an air tube from a surface vessel and to provide, via the air tube, compressed air to the pneumatic clamp device to facilitate attaching the UUV to, or detaching the UUV from, the underwater conduit via the mechanical arms that counteract a force exerted by water flowing around the underwater conduit.

12. The device of claim 11, further comprising a modular interface structure coupled to the UUV and configured to provide a first interface for the UUV that interfaces with the sensing equipment and a second interface for the UUV that interfaces with the pneumatic clamp device.

13. The device of claim 12, wherein the first interface is configured to interface with different types of the sensing equipment.

14. The device of claim 12, wherein the mechanical arms having a length configured for a size of the underwater conduit, and wherein the second interface is configured to interface with different types of the pneumatic clamp device in which respective lengths of the different types differ.

15. The device of claim 11, further comprising conduit traversal equipment comprising a Mecanum wheel that, when attached to the underwater conduit, is configured to facilitate traversing a length of the underwater conduit and facilitate rotating about a circumference of the underwater conduit.

16. The device of claim 11, further comprising navigation equipment configured to autonomously navigate the UUV underwater to a target location of the underwater conduit based on global positioning satellite input received by a proportional-integral-derivative controller, the global positioning satellite input comprise a position of the surface vessel.

17. A method, comprising:

receiving, by a device comprising at least one processor, a first end of an air tube that is coupled to a mother ship at a second end, wherein the first end is received at a clamp interface that interfaces to a clamp comprising at least one of a pneumatic clamp or a hydraulic clamp;

navigating, by the device, underwater to a target location of an underwater pipe via a proportional-integral-derivative controller based on global positioning satellite (GPS) position data associated with the mother ship and a travel distance of the device, wherein the navigating comprises utilizing at least two horizontal thrusters and at least two vertical thrusters; and in response to arrival at the target location, utilizing, by the device, the clamp to couple to the underwater pipe via a set of mechanical arms configured to counteract a force exerted by water that flows around the underwater pipe.

18. The method of claim 17, further comprising operating, by the device, pipe traversal equipment, comprising a Mecanum wheel, to traverse along a length of the underwater pipe or about a circumference of the underwater pipe.

19. The method of claim 17, further comprising activating, by the device, sensor equipment configured to determine a state of the underwater pipe.

20. The method of claim 19, further comprising, in response to a determination that the state of the underwater pipe is able be improved according to a defined improvement criterion, operating, by the device, maintenance equipment configured to improve the state of the underwater pipe according to the defined improvement criterion.

* * * * *